US010889208B2

(12) United States Patent
Condamin et al.

(10) Patent No.: US 10,889,208 B2
(45) Date of Patent: Jan. 12, 2021

(54) TRACK ASSEMBLY

(71) Applicant: Lear Corporation, Southfield, MI (US)

(72) Inventors: Thibaud Condamin, Orliénas (FR); Nordine Hamtache, Roche la Moliere (FR); Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 131 days.

(21) Appl. No.: 16/131,384

(22) Filed: Sep. 14, 2018

(65) Prior Publication Data

US 2019/0337414 A1 Nov. 7, 2019

(30) Foreign Application Priority Data

May 4, 2018 (FR) ...................................... 18 53891
May 4, 2018 (FR) ...................................... 18 53892

(Continued)

(51) Int. Cl.
*B60N 2/00* (2006.01)
*B60N 2/07* (2006.01)
(Continued)

(52) U.S. Cl.
CPC ......... *B60N 2/0732* (2013.01); *B60N 2/0715* (2013.01); *B60N 2/0722* (2013.01);
(Continued)

(58) Field of Classification Search
CPC .... B60N 2/0732; B60N 2/933; B60N 2/0715; B60N 2/0722; B60N 2/0806;
(Continued)

(56) References Cited

U.S. PATENT DOCUMENTS 2,126,143 A   8/1938 McGregor
2,263,554 A   11/1941 Brach
(Continued)

FOREIGN PATENT DOCUMENTS

CN   203190203 U   9/2013
CN   203799201 U   8/2014
(Continued)

OTHER PUBLICATIONS

Co-pending U.S. application, Condamin, et al., U.S. Appl. No. 16/131,360, filed Sep. 14, 2018.
(Continued)

*Primary Examiner* — James A Shriver, II
*Assistant Examiner* — Hilary L Johns
(74) *Attorney, Agent, or Firm* — Fishman Stewart PLLC

(57) ABSTRACT

A track assembly includes a track, a support member, and/or a lever. The support member may be connected to the lever, and/or the lever may include a rotational axis substantially parallel to the track. The lever may rotation about the rotational axis between a first position and/or a second position. The lever may be configured to engage the track in a longitudinal direction when the lever may be in a first position. The lever may be configured to engage the track in a lateral direction when the lever may be in a second position. The lever may be configured to limit longitudinal movement of the support member along the track. The track may include a longitudinal window that may have a first edge and/or a second edge.

20 Claims, 11 Drawing Sheets

US 10,889,208 B2

Page 2

(30) Foreign Application Priority Data

May 4, 2018 (FR) .................................. 18 53893
May 4, 2018 (FR) .................................. 18 53894

(51) Int. Cl.
*B60N 2/54* (2006.01)
*B60N 2/50* (2006.01)
*B60N 2/08* (2006.01)
*B60N 2/20* (2006.01)
*B60R 22/22* (2006.01)
*B60N 2/90* (2018.01)

(52) U.S. Cl.
CPC .......... *B60N 2/0806* (2013.01); *B60N 2/0818* (2013.01); *B60N 2/0843* (2013.01); *B60N 2/20* (2013.01); *B60N 2/502* (2013.01); *B60N 2/54* (2013.01); *B60N 2/933* (2018.02); *B60R 22/22* (2013.01)

(58) Field of Classification Search
CPC ...... B60N 2/0818; B60N 2/0843; B60N 2/20; B60N 2/502; B60N 2/54; B60R 22/22
USPC ...................................................... 280/801.1
See application file for complete search history.

(56) References Cited

U.S. PATENT DOCUMENTS

| | | |
|---|---|---|
| 2,480,622 A | 8/1949 | Warnock |
| 2,678,082 A | 5/1954 | Nathan |
| 3,181,102 A | 4/1965 | Fehr |
| 3,213,403 A | 10/1965 | Hermann |
| 3,268,848 A | 8/1966 | Adams |
| 3,940,182 A | 2/1976 | Tamura |
| 4,020,769 A | 5/1977 | Keir |
| 4,198,025 A | 4/1980 | Lowe et al. |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,776,809 A | 10/1988 | Hall |
| 4,830,531 A | 5/1989 | Condit et al. |
| 4,961,559 A | 10/1990 | Raymor |
| 4,969,621 A | 11/1990 | Munchow et al. |
| 4,987,316 A | 1/1991 | White et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,322,982 A | 6/1994 | Leger et al. |
| 5,332,290 A | 7/1994 | Borlinghaus et al. |
| 5,348,373 A | 9/1994 | Stiennon |
| 5,446,442 A | 8/1995 | Swart et al. |
| 5,466,892 A | 11/1995 | Howard et al. |
| 5,489,173 A | 2/1996 | Hofle |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A * | 9/1998 | Tsuchiya ............ B60N 2/0715 248/430 |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,036,157 A | 3/2000 | Baroin et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,299,230 B1 | 10/2001 | Oettl |
| 6,318,802 B1 | 11/2001 | Sjostrom et al. |
| 6,357,814 B1 | 3/2002 | Boisset et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,113,541 B1 | 9/2006 | Lys et al. |
| 7,159,899 B2 | 1/2007 | Nitschke et al. |
| 7,170,192 B2 | 1/2007 | Kazmierczak |
| 7,207,541 B2 | 4/2007 | Frohnhaus et al. |
| 7,271,501 B2 | 9/2007 | Dukart et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,388,466 B2 | 6/2008 | Ghabra et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,561,770 B2 | 2/2017 | Sievers et al. |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |

(56) References Cited

U.S. PATENT DOCUMENTS

| | | | |
|---|---|---|---|
| 9,731,628 B1 | 8/2017 | Rao et al. | |
| 9,758,061 B2 | 9/2017 | Pluta et al. | |
| 9,789,834 B2 | 10/2017 | Rapp et al. | |
| 9,796,304 B2 | 10/2017 | Salter et al. | |
| 9,815,425 B2 | 11/2017 | Rao et al. | |
| 9,821,681 B2 | 11/2017 | Rao et al. | |
| 9,840,220 B2 | 12/2017 | Van Buskirk et al. | |
| 9,919,624 B2 | 3/2018 | Cziomer et al. | |
| 9,950,682 B1 | 4/2018 | Gramenos et al. | |
| 10,059,232 B2 | 8/2018 | Frye et al. | |
| 10,160,351 B2 | 12/2018 | Sugimoto et al. | |
| 10,479,227 B2 | 11/2019 | Nolte et al. | |
| 10,493,243 B1 | 12/2019 | Braham | |
| 10,549,659 B2 | 2/2020 | Sullivan et al. | |
| 10,654,378 B2 | 5/2020 | Pons | |
| 2005/0046367 A1 | 3/2005 | Wevers et al. | |
| 2005/0089367 A1 | 4/2005 | Sempliner | |
| 2005/0150705 A1 | 7/2005 | Vincent et al. | |
| 2005/0211835 A1 | 9/2005 | Henley et al. | |
| 2005/0215098 A1 | 9/2005 | Muramatsu et al. | |
| 2005/0230543 A1 | 10/2005 | Laib et al. | |
| 2005/0258676 A1 | 11/2005 | Mitchell et al. | |
| 2006/0131470 A1 | 6/2006 | Yamada et al. | |
| 2006/0208549 A1 | 9/2006 | Hancock et al. | |
| 2006/0220411 A1 | 10/2006 | Pathak et al. | |
| 2008/0021602 A1 | 1/2008 | Kingham et al. | |
| 2008/0084085 A1* | 4/2008 | Mizuno | B60N 2/123 296/65.13 |
| 2008/0090432 A1 | 4/2008 | Patterson et al. | |
| 2009/0129105 A1 | 5/2009 | Kusu et al. | |
| 2009/0251920 A1 | 10/2009 | Kino et al. | |
| 2009/0302665 A1 | 12/2009 | Dowty | |
| 2009/0319212 A1 | 12/2009 | Cech et al. | |
| 2010/0117275 A1 | 5/2010 | Nakamura | |
| 2011/0024595 A1 | 2/2011 | Oi et al. | |
| 2012/0112032 A1 | 5/2012 | Kohen | |
| 2013/0020459 A1 | 1/2013 | Moriyama et al. | |
| 2013/0035994 A1 | 2/2013 | Pattan et al. | |
| 2014/0263920 A1 | 9/2014 | Anticuar et al. | |
| 2014/0265479 A1 | 9/2014 | Bennett | |
| 2015/0048206 A1 | 2/2015 | Deloubes | |
| 2015/0069807 A1 | 3/2015 | Kienke | |
| 2015/0083882 A1 | 3/2015 | Stutika et al. | |
| 2015/0191106 A1 | 7/2015 | Inoue et al. | |
| 2015/0236462 A1 | 8/2015 | Davidson, Jr. et al. | |
| 2016/0039314 A1 | 2/2016 | Anticuar et al. | |
| 2016/0154170 A1 | 6/2016 | Thompson et al. | |
| 2016/0236613 A1 | 8/2016 | Trier | |
| 2017/0080825 A1 | 3/2017 | Bonk et al. | |
| 2017/0080826 A1 | 3/2017 | Bonk et al. | |
| 2017/0166093 A1* | 6/2017 | Cziomer | B60N 2/0806 |
| 2017/0261343 A1 | 9/2017 | Lanter et al. | |
| 2017/0291507 A1 | 10/2017 | Hattori et al. | |
| 2018/0017189 A1 | 1/2018 | Wegner | |
| 2018/0039917 A1 | 2/2018 | Buttolo et al. | |
| 2018/0086232 A1 | 3/2018 | Kume | |
| 2018/0105072 A1 | 4/2018 | Pons | |
| 2018/0148011 A1 | 5/2018 | Zaugg et al. | |
| 2018/0183623 A1 | 6/2018 | Schoenfeld et al. | |
| 2018/0275648 A1 | 9/2018 | Ramalingam | |
| 2019/0001846 A1* | 1/2019 | Jackson | B60N 2/01508 |
| 2019/0084453 A1 | 3/2019 | Petit et al. | |
| 2019/0126786 A1 | 5/2019 | Dry et al. | |
| 2019/0337413 A1 | 11/2019 | Romer | |
| 2019/0337417 A1 | 11/2019 | Condamin et al. | |
| 2019/0337418 A1 | 11/2019 | Condamin et al. | |
| 2019/0337419 A1 | 11/2019 | Condamin et al. | |
| 2019/0337420 A1 | 11/2019 | Condamin et al. | |
| 2019/0337471 A1 | 11/2019 | Brehm | |
| 2019/0379187 A1 | 12/2019 | Christensen et al. | |
| 2019/0389336 A1 | 12/2019 | Malinowski et al. | |
| 2020/0009995 A1 | 1/2020 | Sonar | |
| 2020/0055423 A1 | 2/2020 | Prozzi et al. | |
| 2020/0079244 A1 | 3/2020 | Carbone et al. | |
| 2020/0180516 A1 | 6/2020 | Moulin | |
| 2020/0180517 A1 | 6/2020 | Moulin | |
| 2020/0189504 A1 | 6/2020 | Ricart et al. | |
| 2020/0189511 A1 | 6/2020 | Ricart et al. | |
| 2020/0194936 A1 | 6/2020 | Ricart et al. | |
| 2020/0194948 A1 | 6/2020 | Lammers et al. | |
| 2020/0207241 A1 | 7/2020 | Moulin et al. | |
| 2020/0262367 A1 | 8/2020 | Fernandez Banares et al. | |
| 2020/0269754 A1 | 8/2020 | Ricart et al. | |
| 2020/0282871 A1 | 9/2020 | Ricart et al. | |
| 2020/0282880 A1 | 9/2020 | Jones et al. | |

FOREIGN PATENT DOCUMENTS

| | | |
|---|---|---|
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 A2 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005/068247 A2 | 7/2005 |

OTHER PUBLICATIONS

Co-pending U.S. application, Condamin, et al., U.S. Appl. No. 16/131,404, filed Sep. 14, 2018.
Co-pending U.S. application, Condamin, et al., U.S. Appl. No. 16/131,415, filed Sep. 14, 2018.
Co-pending U.S. application, Condamin, et al., U.S. Appl. No. 16/131,614, filed Sep. 14, 2018.
Co-pending U.S. Appl. No. 16/597,187, filed Oct. 9, 2019.
Co-pending U.S. Appl. No. 16/672,989, filed Nov. 4, 2019.
Co-pending U.S. Appl. No. 16/711,661, filed Dec. 12, 2019.

* cited by examiner

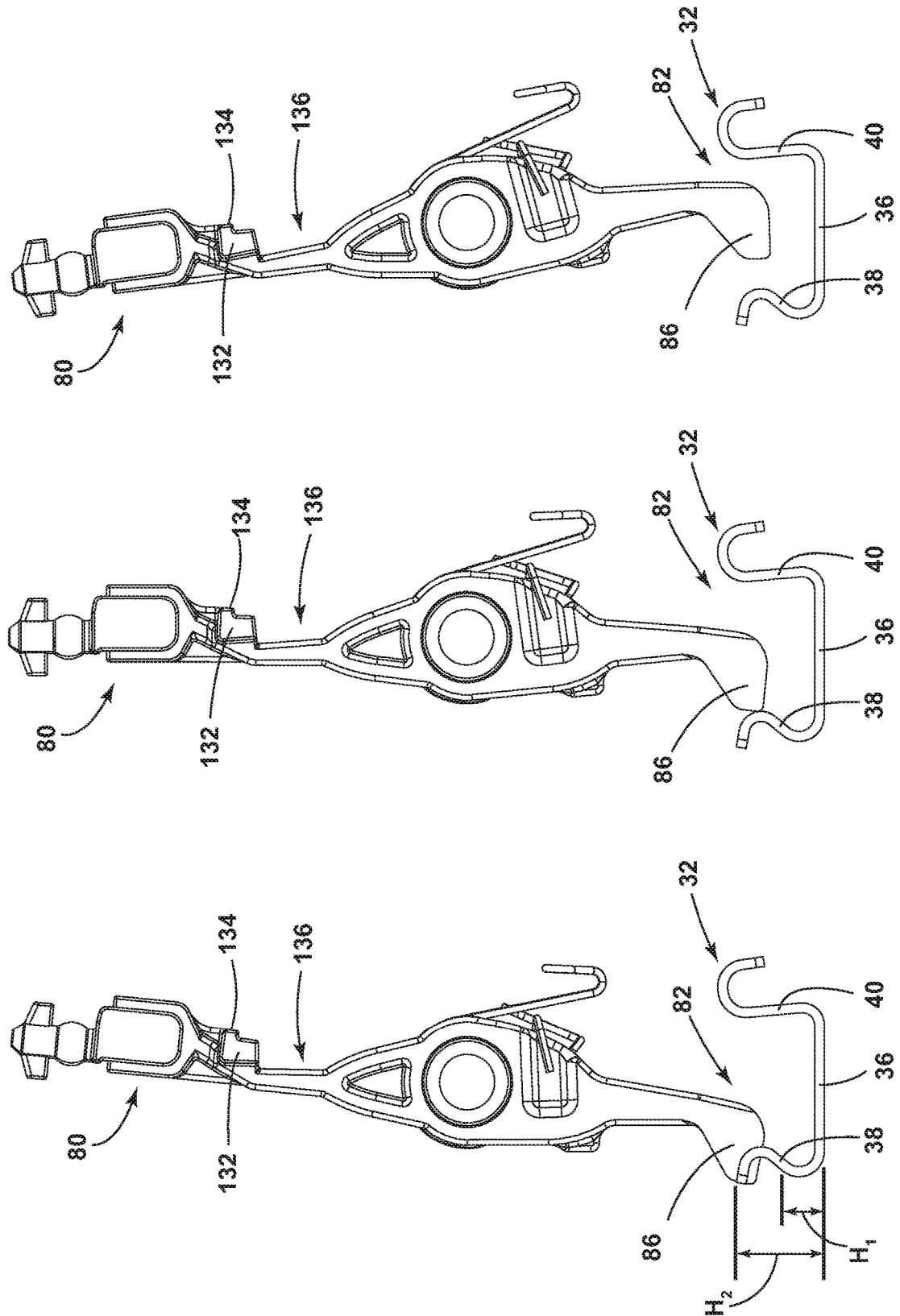

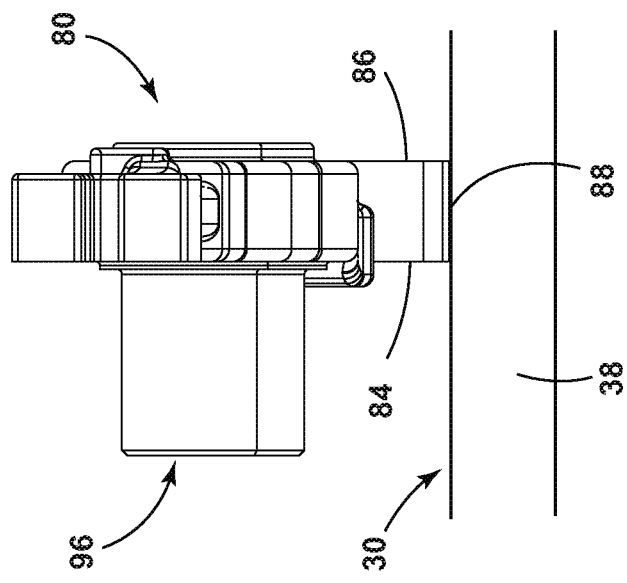
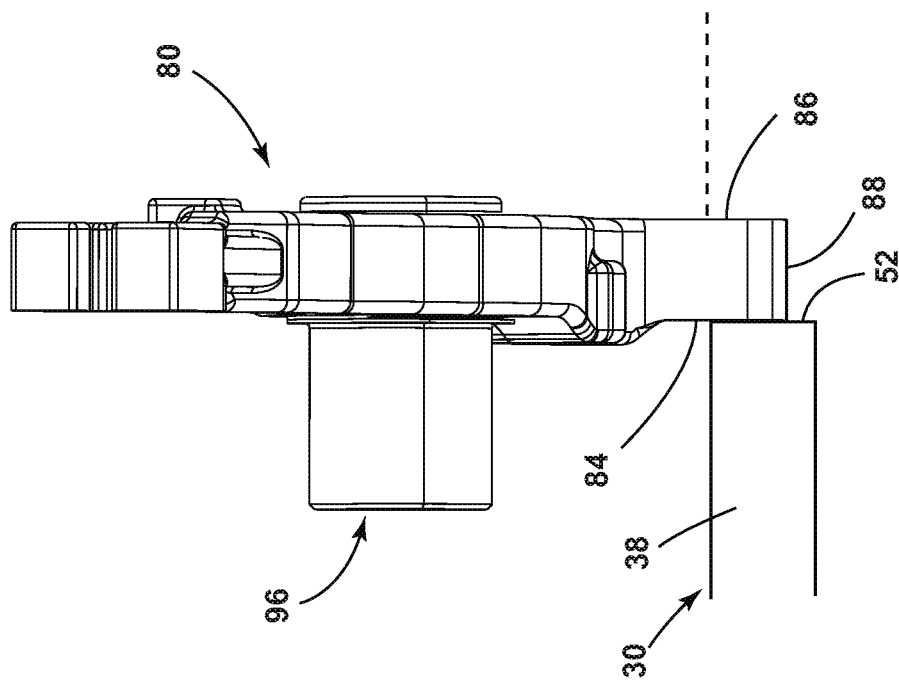
FIG. 4E
FIG. 4D

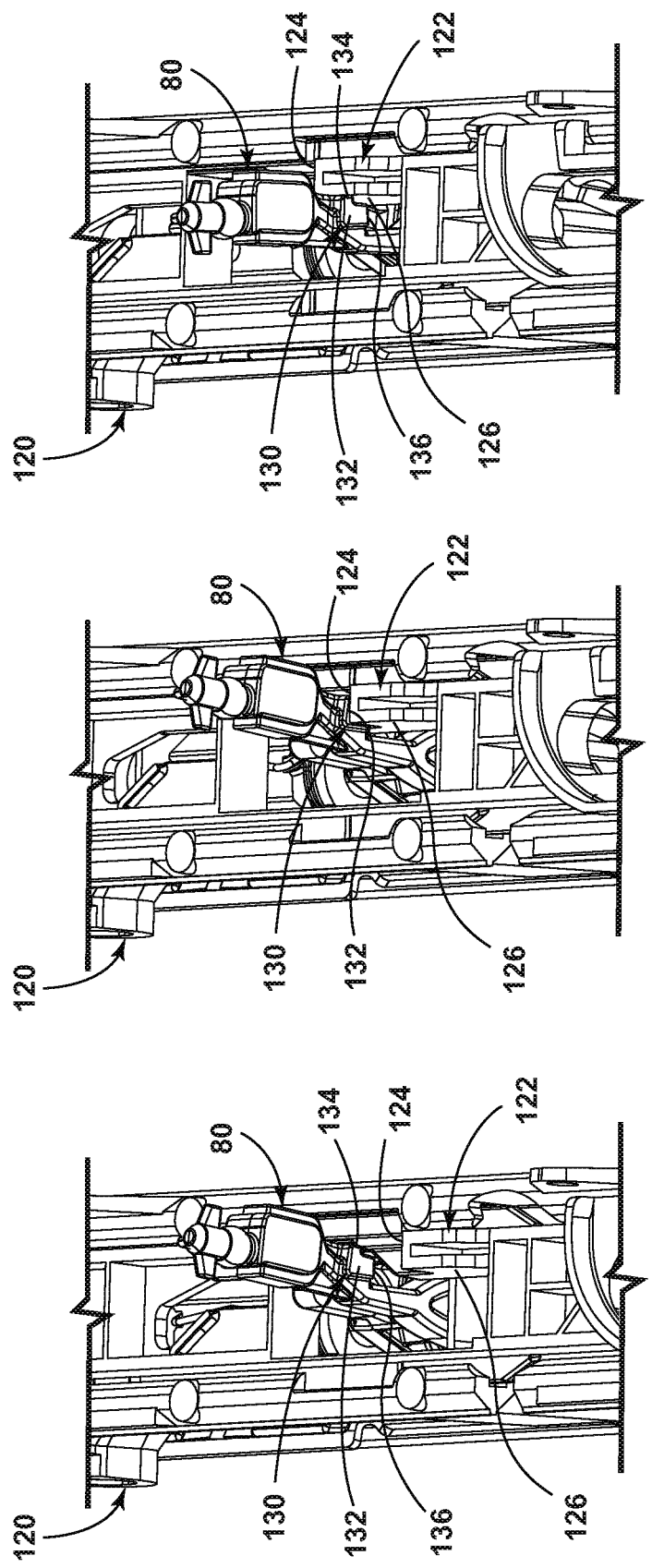

TRACK ASSEMBLY

CROSS-REFERENCE TO RELATED APPLICATIONS

This application claims the benefit of French Patent Application Serial No. 1853891, filed on May 4, 2018; French Patent Application Serial No. 1853892, filed on May 4, 2018; French Patent Application Serial No. 1853893, filed on May 4, 2018; and French Patent Application Serial No. 1853894, filed on May 4, 2018; the disclosures of which are hereby incorporated herein by reference in their entireties.

TECHNICAL FIELD

The present disclosure generally relates to track assemblies, including track assemblies that may be used in connection with vehicle seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may be relatively complex and/or may not provide sufficient functionality.

There is a desire for solutions/options that minimize or eliminate one or more challenges or shortcomings of track assemblies. The foregoing discussion is intended only to illustrate examples of the present field and should not be taken as a disavowal of scope.

SUMMARY

In embodiments, a track assembly may include a track, a support member, and/or a lever. The support member may be connected to the lever, and/or the lever may include a rotational axis that may be substantially parallel to the track. The lever may rotate about the rotational axis between a first position and/or a second position. The lever may be configured to engage the track in a longitudinal direction when the lever is in the first position. The lever may be configured to engage the track in a lateral direction when the lever may be in the second position. The lever may be configured to limit longitudinal movement of the support member along the track. The track may include a longitudinal window that may have a first edge and/or a second edge. A location of the longitudinal window may correspond to a seat position relative to a seat belt assembly. The lever may be connected to a biasing element that may be configured to move the lever from the second position to the first position when the contact portion may be laterally aligned with the window. The support member may be connected to a seat that may include a seat back and a seat cushion. The lever may be connected to an actuator. The actuator may be configured to restrict movement of at least one of the seat back and/or the seat cushion.

With embodiments, a seat may be connected to the support assembly and/or the seat may not be in a seating configuration when the lever may be in the second position. A seat may be connected to the support assembly and/or the seat may be in a seating configuration when the lever may be in the first position. A seat belt assembly may include a mounting portion, and/or the seat belt assembly may not move with the support member. The lever may be connected to a biasing element that may be configured to bias the lever toward the first position. The lever may include a contact portion that may have a first portion, a second portion, and/or a third portion. The track may include a window that may have a first edge and/or a second edge. At least one of the first portion and/or the second portion may be configured to contact at least one of the first edge and/or the second edge of the window.

In embodiments, longitudinal movement of the support assembly may be limited when the third portion of the contact portion may not be in contact with the track. Longitudinal movement of the support assembly may not be limited when the third portion of the contact portion may be in contact with the track. The contact portion may be substantially triangular. The third portion may not contact the track in the first position, and/or the third portion may contact an inner surface of the track in the second position. The first portion and the second portion may be substantially parallel. The first portion and/or the second portion may be substantially perpendicular to a longitudinal direction of the track. A vehicle may include a track assembly, a vehicle body, and/or a seat belt assembly. The seat belt assembly may be connected to the vehicle body. The first position may correspond to a seating configuration that may be proximate the seat belt assembly. The second position may correspond to a non-seating configuration. The seat belt assembly may be fixedly attached to the vehicle body. The proximity of the seat belt assembly to a window in the track may correspond to a comfort range where a seat back and a seat cushion may be actuated.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 4A is a cross-sectional view generally illustrating portions of embodiments of a track and a lever, with the lever in a first position, according to teachings of the present disclosure.

FIG. 4B and 4C are cross-sectional views generally illustrating portions of embodiments of tracks and levers, with the levers in second positions, according to teachings of the present disclosure.

FIG. 4D is a perspective view generally illustrating portions of embodiments of a track and a lever, with the lever in a first position, according to teachings of the present disclosure.

FIG. 4E is a perspective view generally illustrating portions of embodiments of a track and a lever, with the lever in a second position, according to teachings of the present disclosure.

FIG. 7A is a perspective view generally illustrating portions of an embodiment of a lever in a first position and a slider in a first position according to teachings of the present disclosure.

FIG. 7B is a perspective view generally illustrating portions of an embodiment of a lever in a first position and a slider in a second position according to teachings of the present disclosure.

FIG. 7C is a perspective view generally illustrating portions of an embodiment of a lever in a second position and a slider in a third position according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1A:
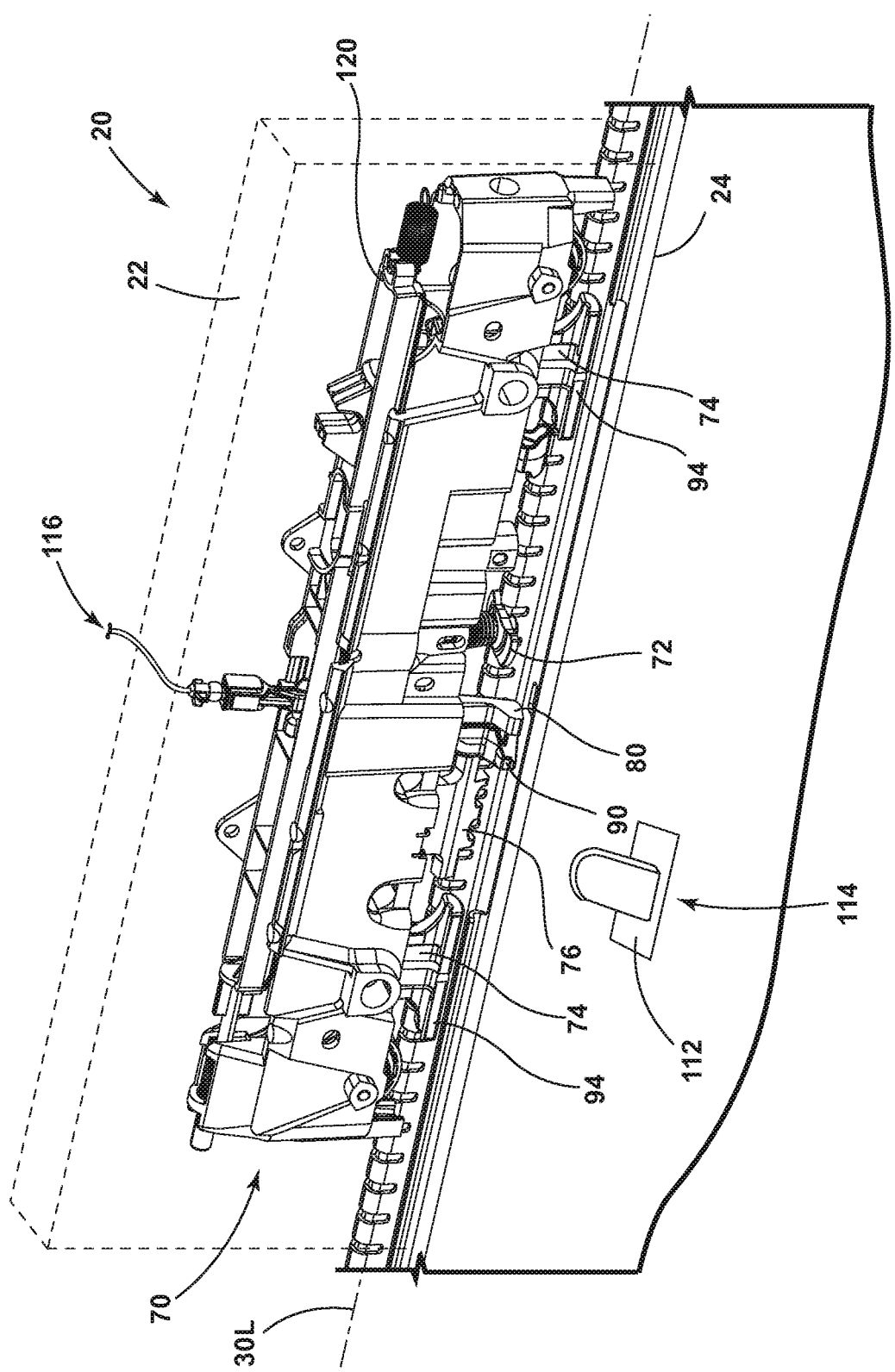
FIG. 1A is a perspective view generally illustrating an embodiment of a track assembly according to teachings of the present disclosure.
Figure 1B:
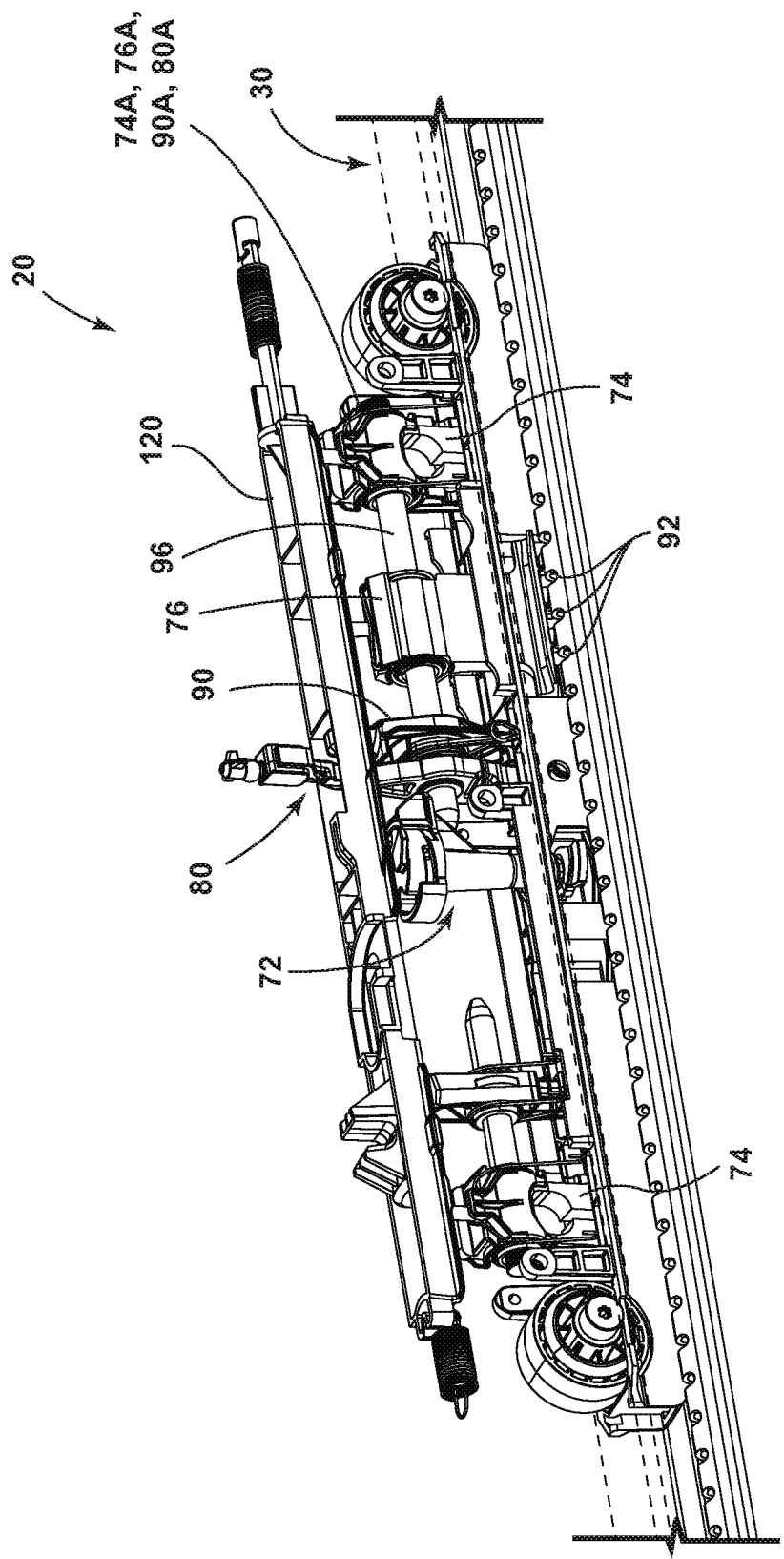
FIG. 1B is a perspective view generally illustrating portions of an embodiment of a track assembly according to teachings of the present disclosure.

In embodiments, such as generally illustrated in FIGS. 1A and 1B, a track assembly 20 may include a track 30, a support member 70, and/or a first lever 80. The track assembly 20 may be configured to support an external component 22 on a track 30. An external component 22 may include a seating element and/or a vehicle seat, and may be referred to herein as a seat 22, but is not limited to a seat or seating components. The support member 70 may move (e.g., slide, roll, etc.) along a track 30. The track assembly 20 may be connected to a mounting surface 24 (e.g., such as a floor and/or body of a vehicle).

Figure 2:
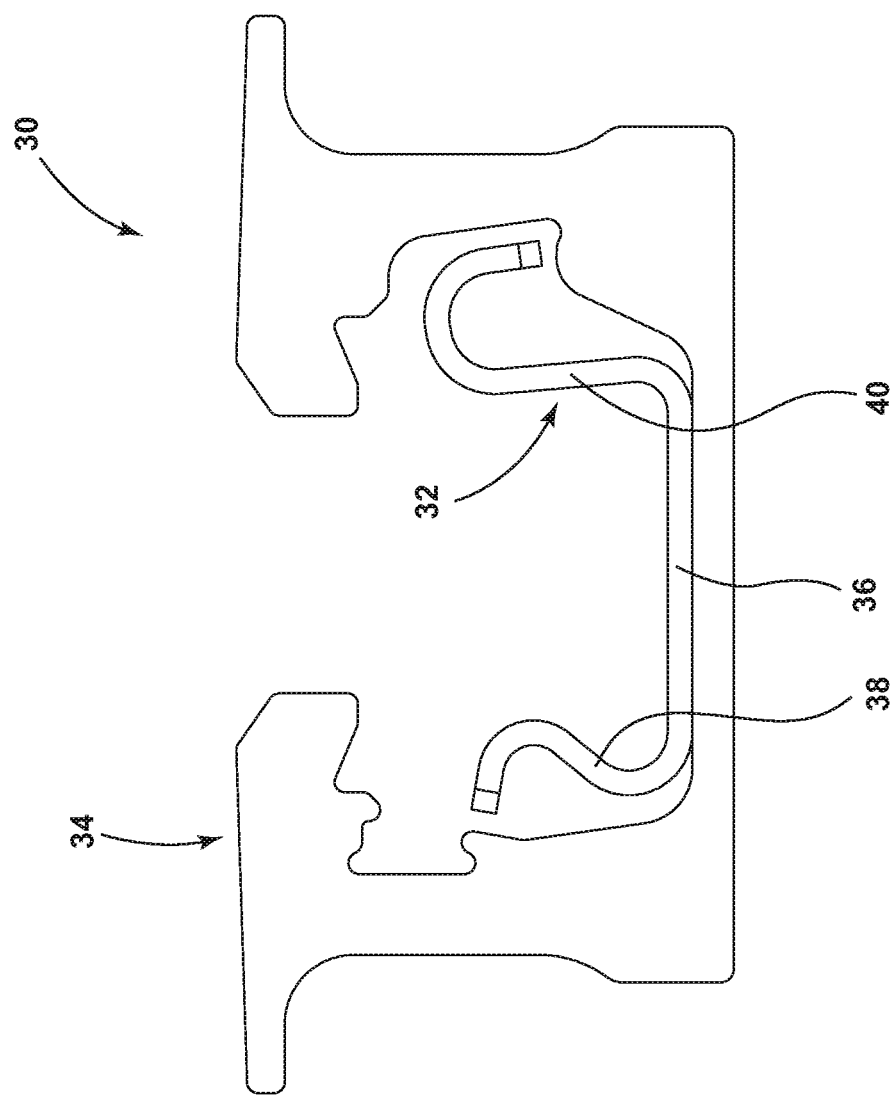
FIG. 2 is a side view generally illustrating portions of an embodiment of a track assembly according to teachings of the present disclosure.

In embodiments, such as generally illustrated in FIGS. 1A and 1B, a track 30 may extend in a longitudinal direction and may include a longitudinal axis 30L. As generally illustrated in FIG. 2, the track 30 may include an inner portion 32 and an outer portion 34. The inner portion 32 may include a bottom wall 36, a first side wall 38, and/or a second side wall 40. The bottom wall 36, the first side wall 38, and/or the second side wall 40 may be connected to form a generally U-shaped configuration. The bottom wall 36 may, for example, be substantially planar. The first side wall 38 and/or the second side wall 40 may extend from lateral ends of the bottom wall 36. The first side wall 38 and/or the second side wall 40 may be curved (e.g., may include a generally C-shaped profile). A side wall (e.g., the first side wall 38) may, for example, include a C-shaped profile that may open outward. A side wall (e.g., the second side wall 40) may, for example, include a C-shaped profile that may open downward. With embodiments, the first side wall 38 may include a window 50. The inner portion 32 may be disposed within the outer portion 34 of the track 30. The outer portion 34 may be generally U-shaped.

Figure 3:
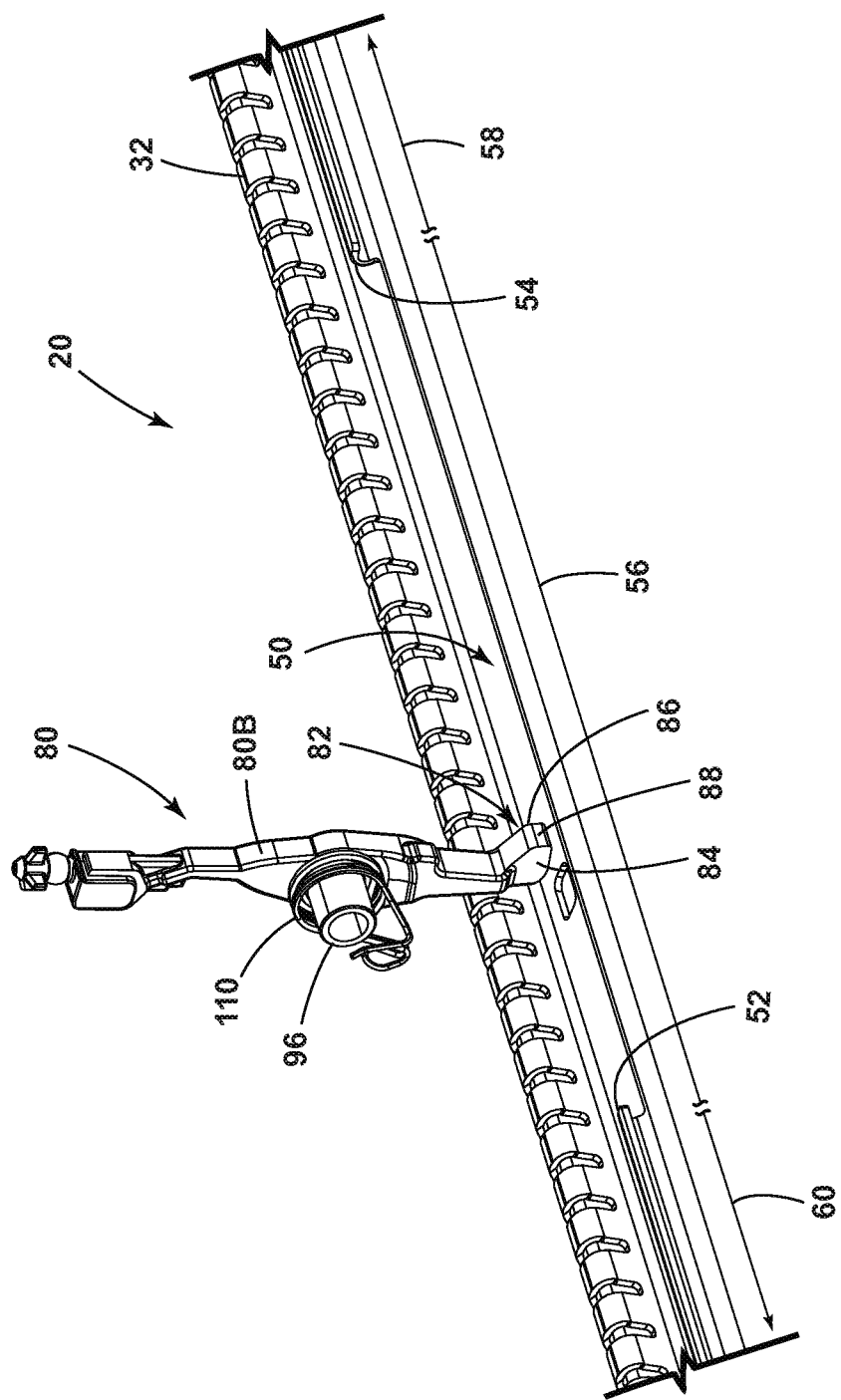
FIG. 3 is a perspective view generally illustrating portions of an embodiment of a track assembly according to teachings of the present disclosure.

In embodiments, such as generally illustrated in FIG. 3, the window 50 may be configured as a recess in the first side wall 38. The window 50 may extend longitudinally along the first side wall 38. The length of the window 50 may be a percentage of the total length of the track 30. For example and without limitation, the length of the window 50 may be less than 50% of the total length of the track 30. The window 50 may correspond to a portion of the first side wall 38 with a reduced height. The first side wall 38 may include a first height $H_1$ at or about the window 50, and/or a remainder of the first side wall 38 may include a second height $H_2$. The first height $H_1$ may be less than the height $H_2$. The first height $H_1$ may, for example and without limitation, be about one-third, one-half, or two-thirds the second height $H_2$. The window 50 may include a first edge 52 and a second edge 54. The first edge 52 may be disposed at a rear end of the window 50, and the second edge 54 may be disposed at a front end of the window 50. The track 30 may include a first portion 56, a second portion 58, and/or a third portion 60. The first portion 56 may correspond to a comfort range of the seat 22. The second portion 58 may correspond to an easy-entry range of the seat 22. The window 50 may extend along some or all of the length of the first portion 56. The first portion 56 may be disposed between (e.g., longitudinally) the second portion 58 and the third portion 60. The second edge 54 of the window 50 may be proximate and/or adjacent to the second portion 58. The first edge 52 of the window 50 may be proximate and/or adjacent to the third portion 60.

In embodiments, such as generally illustrated in FIGS. 1A and 1B, the support member 70 may be configured to connect to a track 30. For example and without limitation, the support member 70 may move in a longitudinal direction along the track 30. The support member 70 may be configured to selectively engage with and/or disengage from the track 30. The support member 70 may be substantially parallel to the longitudinal direction and/or may be generally rectangular.

In embodiments, the support member 70 may include a cassette configuration, and/or may include a cam 72, anchoring components 74, and/or a locking component 76 (e.g., which may be configured to selectively connect the support member 70 with the track 30). The support member 70 may include a first lever 80 and a second lever 90. The first lever 80, the second lever 90, the cam 72, the anchoring components 74, and/or the locking component 76 may be disposed substantially within the support member 70. The cam 72 may be configured to rotate about a vertical axis. The cam 72 may limit vertical movement and/or play of the support member 70 relative to the track 30. The locking component 76 may include one or more track locking portions 92 that may be inserted (vertically and/or longitudinally) into the track 30 to restrict longitudinal movement of the support member 70. An anchoring component 74 may include an engagement portion 94 to selectively connect the support member 70 to the outer portion 34 of the track 30. The anchoring components 74 may be configured to limit movement of the support member 70 under crash-loads. The first lever 80, the second lever 90, the cam 72, and/or the locking component 76 may engage the inner portion 32 of the track 30. The anchoring component 74, the locking component 76, the first lever 80, and/or the second lever 90 may rotate about axes 74A, 76A, 80A, 90A, which may be substantially coincident (e.g., may effectively rotate about the same axis). One or more of axes 74A, 76A, 80A, 90A may be disposed substantially parallel with a longitudinal direction and/or may be disposed above the track 30 (see, e.g., FIG. 1B). The anchoring component(s) 74, the locking component 76, the first lever 80, and/or the second lever 90 may be connected via a rod 96. In embodiments, the rod 96 may extend in a longitudinal direction. The rod 96 may be supported by the support member 70 and/or may support the anchoring component(s) 74, the locking component 76, the first lever 80, and/or the second lever 90. The second lever 90 may be configured to automatically move from a first position to a second positon by contacting an edge (e.g., the second edge 54) of the window 50, such as without being actuated by an actuator 120 (e.g., a slider). The actuator 120 may be configured to cause the second lever 90 to move from the first position to the second position such that the second lever 90 does not contact an edge (e.g., the first edge 52) of the track 30, which may facilitate movement of the support member 70 into the third portion 60 of the track 30. The support member 70 may be selectively connected to the track 30 via the anchoring component(s) 74, the locking component 76, the first lever 80, and/or the second lever 90.

In embodiments, such as generally illustrated in FIG. 3, a first lever 80 may include a contact portion 82. The contact portion 82 may be disposed at or about a lower end of the first lever 80. The contact portion 82 may include one or more of a variety of shapes, sizes, and/or configurations. For example and without limitation, the contact portion 82 may be substantially triangular, such as viewed from a longitudinal direction (see, e.g., FIGS. 4A, 4B, and 4C). The contact portion 82 may include a first portion 84 (e.g., a rear side) and a second portion 86 (e.g., a front side). If the contact portion 82 is disposed in the inner portion 32 of the track 30, the first portion 84 of the contact portion 82 may be closer than the second portion 86 to the first edge 52 of the window 50, and the second portion 86 may be closer than the first portion 84 to the second edge 54 of the track. The first portion 84 and/or the second portion 86 may be configured to selectively contact the track 30 (e.g., the first edge 52, the second edge 54, and/or the first side wall 38 of the track 30). A body 80B of the first lever 80 may be disposed substantially within the support member 70 and portions of the contact portion 82 may be disposed substantially outside the support member 70.

With embodiments, the first portion 84 and/or the second portion 86 of the contact portion 82 may be substantially planar. The first portion 84 and/or the second portion 86 may be substantially perpendicular to the longitudinal axis. The third portion 88 may be substantially planar and/or may be substantially parallel to the longitudinal axis 30L.

In embodiments, a first lever 80 may include a first position (see, e.g., FIGS. 4A and 4D) and/or a second position (see, e.g., FIGS. 4B, 4C, and 4E). If the support member 70 is disposed within the first portion 56 (e.g., a comfort range) of the track 30, the first lever 80 may be disposed in the first position. With embodiments, the first lever 80 and/or the contact portion 82 may be connected to a biasing member 110 (see, e.g., FIG. 3). The biasing member 110 may bias (e.g., rotatably bias) the contact portion 82 toward a first position.

Figure 5A:
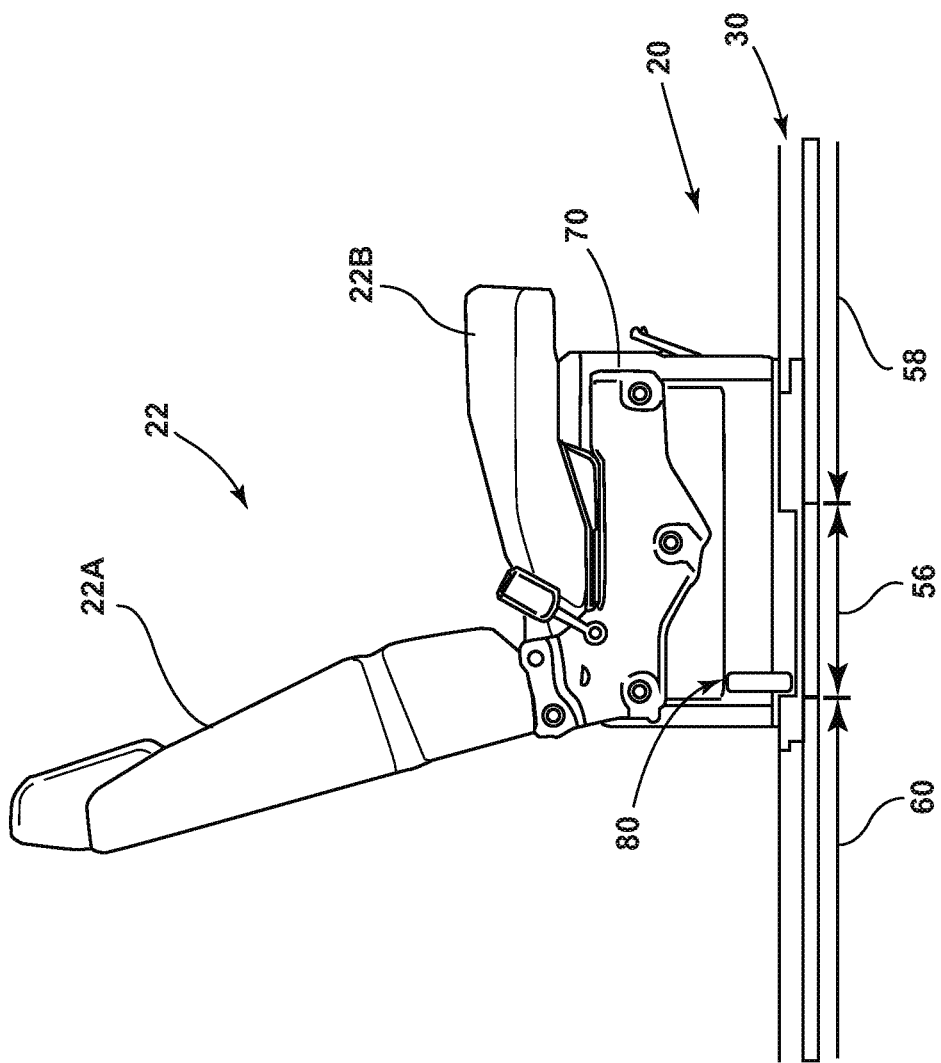
FIGS. 5A is a side view generally illustrated portions of embodiments of a seat in a seating configuration and a track assembly with a support member in a first portion of a track according to teachings of the present disclosure.

While the first lever 80 is in the first position, the seat may be disposed in a seating configuration (e.g., a nominal position), such as generally illustrated in FIG. 5A. In the seating configuration, a seat back 22A may be substantially vertical and/or a seat cushion 22B may be substantially horizontal.

In embodiments, if the first lever 80 is in the first position, the contact portion 82 may be longitudinally aligned with the first side wall 38 of the track 30 (see, e.g., FIGS. 4A and 5A). For example and without limitation, as the support member 70 moves in the first portion 56 of the track 30 with the first lever 80 in the first position, the first lever 80 may contact the first edge 52 of the window 50 as the support member 70 reaches the rear end of the window 50, which may restrict and/or prevent further rearward movement of the support member 70, such as into the third portion 60.

In embodiments, if the first lever 80 is in the first position and the support member 70 disposed in the first portion 56 of the track 30, the first portion 84 of the contact portion 82 may contact the first edge 52 of the window 50 when the support member 70 is moving in a first direction (e.g., rearward) to a first end (e.g., a rear end) of the window 50. In such a configuration, contact between the first portion 84 and the first edge 52 of the window 50 may limit and/or prevent further movement of the support member 70 in the first direction (see, FIG. 4D). Additionally and alternatively, as the support member 70 moves in the first portion 56 of the track 30 in a second direction (e.g., forward) with the first lever 80 in the first position, the first lever 80 may contact the second edge 54 of the window 50 as the support member 70 reaches the second end (e.g., a front end) of the window 50, which may restrict and/or prevent further movement of the support member 70 in the second direction, such as into the second portion 58.

With embodiments, such as generally illustrated in FIGS. 4B, 4C, and 4D, if the first lever 80 is in the second position, the contact portion 82 may not be longitudinally aligned with the first edge 52 or the second edge 54 of the window 50 (e.g., the contact portion 82 and the first side wall 38 and/or second side wall 40 may not substantially overlap). In embodiments, such as generally shown in FIG. 4B, in the second position, the third portion 88 of the contact portion 82 may contact an inner surface of the first side wall 38 of the track 30 (e.g., contact/engage the first side wall 38 from a lateral direction). This contact may, for example, be the only contact, if any, between the contact portion 82 and the track 30 in the second position of the first lever 80. In some configurations, in the second position, the contact portion 82 may be rotated such that the third portion 88 of the contact portion 82 may not contact the track 30. Contact between the third portion 88 of the contact portion 82 and the track 30, if any, may not substantially limit and/or prevent movement of the support member 70 with respect to the track 30. The contact portion 82 may rotate, for example and without limitation, about 45 degrees or less when moving between the first position and the second position, or may rotate a greater amount. In embodiments, the contact portion 82 may automatically move from the second position to the first position, such as via a biasing member 110 and/or without any external forces (e.g., without direction actuation via an actuator/slider 120).

With embodiments, the window 50 may correspond to an area of the track 30 where the seat 22 may be safe to use in a seating configuration. The track assembly 20 may include a seat belt assembly 114. The seat belt assembly 114 may include a mounting portion 112 which may be connected (e.g., fixed) to a mounting surface 24, such as a floor of a vehicle (see, FIG. 1A). The mounting portion 112 may not move relative to the track 30 (e.g., the mounting portion 112 may be fixed to the mounting surface 24 and may not move with the support member 70.

In embodiments, the first portion 56 and/or and the window 50 of the track 30 may correspond to the mounting location of the seat belt assembly 114. For example, the first edge 52 and the second edge 54 of the window 50 may correspond to maximum separation distances between the seat belt assembly 114 and the support member 70, such as to define a safe seating zone in which the seat belt assembly 114 is configured to function properly. In the safe seating zone (e.g., the first portion 56 of the track 30), support member 70 and/or the seat 22 may be disposed in a proper/safe position relative to the seat belt assembly 114, which may facilitate proper use of the seat belt assembly 114 for an occupant of the seat 22.

With embodiments, the track assembly 20 may be configured to limit use of the seat 22 to the first portion 56 of the track 30. The support member 70 may move outside the first portion 56 of the track 30, and the support member 70 restrict the configuration of the seat 22 to a non-seating configuration (e.g., the seat back may be horizontal or the seat cushion may be vertical).

Figure 6A:
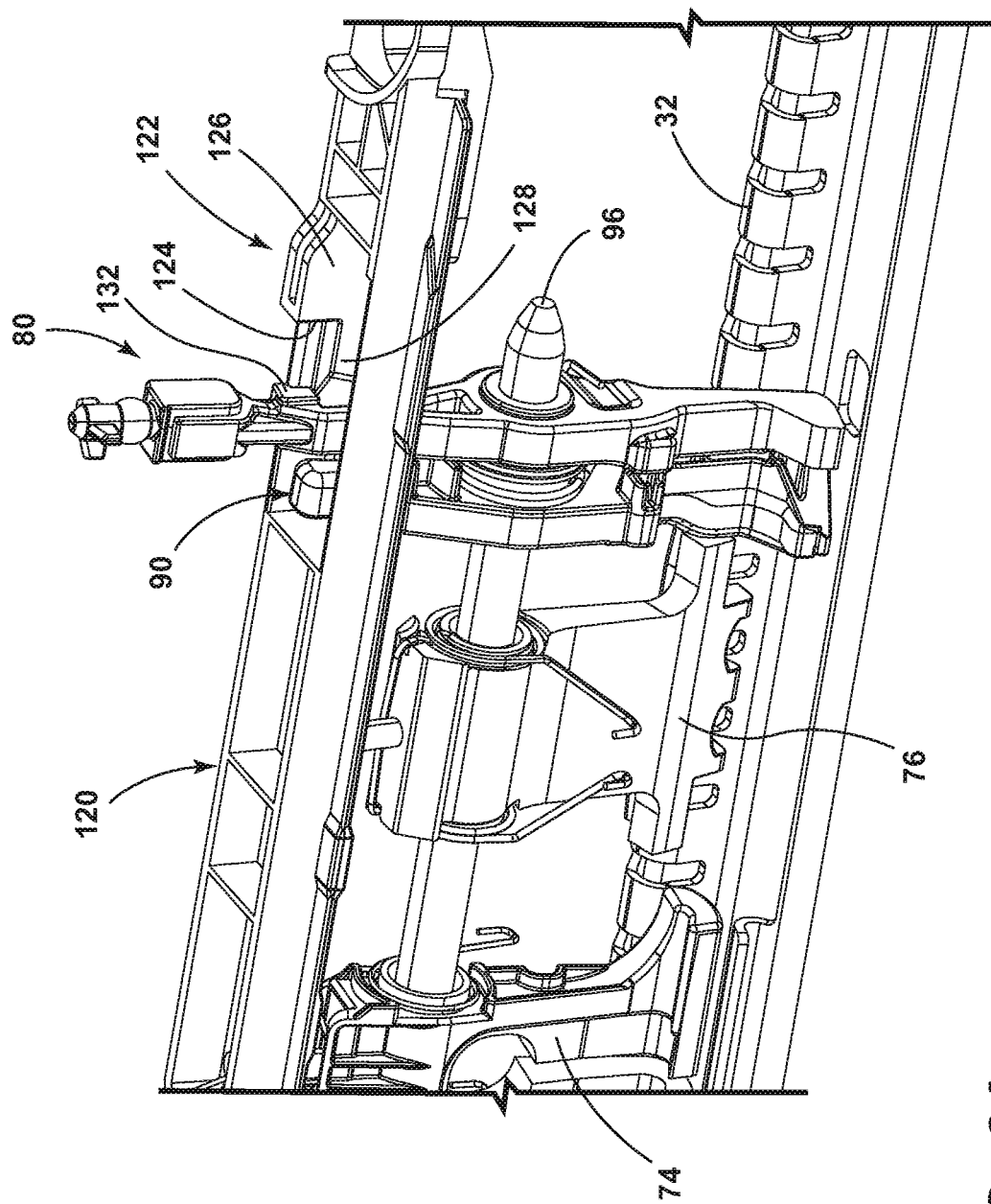
FIGS. 6A and 6B are side views generally illustrating portions of embodiments of track assemblies according to teachings of the present disclosure.
Figure 6B:
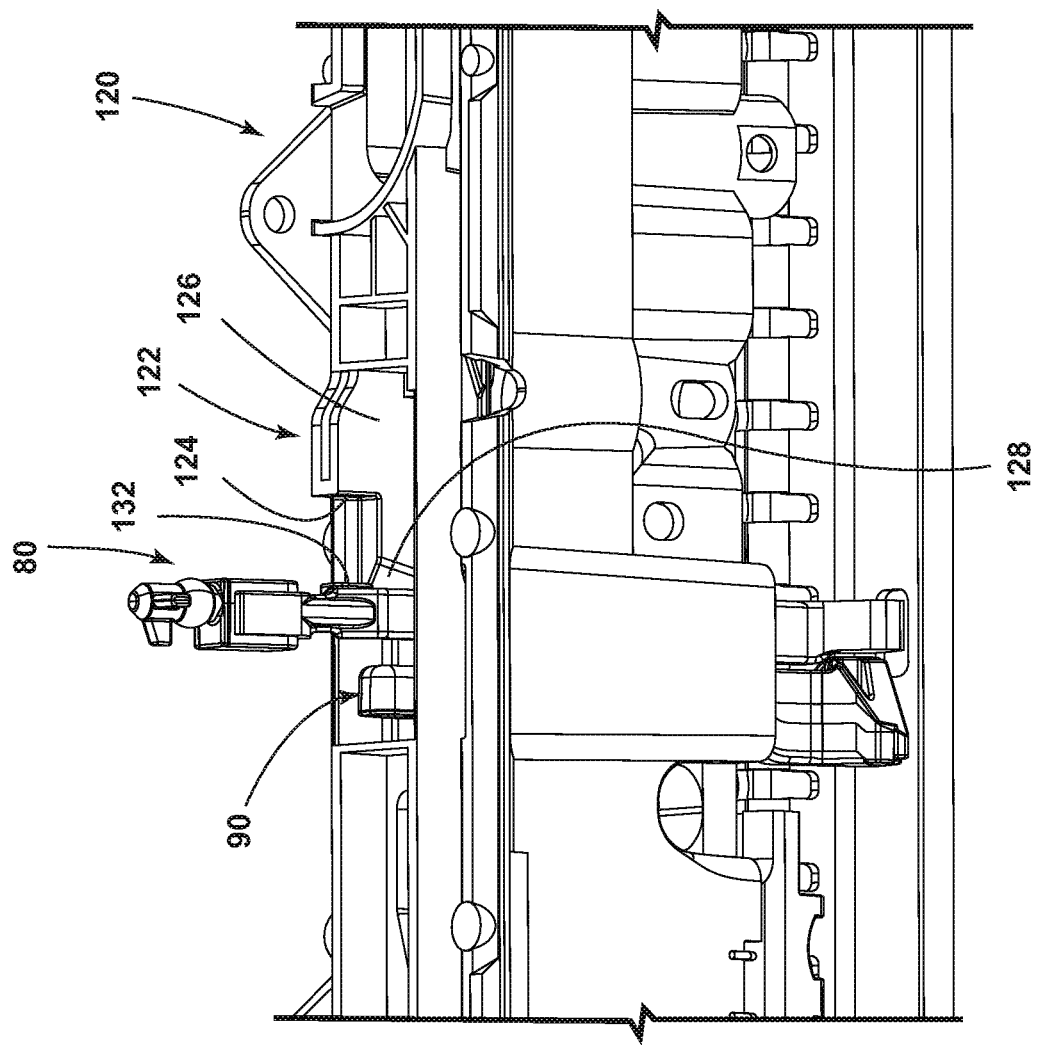

In embodiments, as shown in FIGS. 6A and 6B, the track assembly 20 may include an actuator 120. The actuator 120 may be configured to slide with respect to the support member 70 and may be referred to as a slider 120, but is not limited to a slider. The slider 120 may interact and/or connect with a variety of elements and/or components. For example and without limitation, the slider 120 may be configured to move longitudinally to move and/or limit movement of the cam 72, the anchoring component(s) 74, the locking component 76, the first lever 80, and/or the second lever 90. The slider 120 may be connected to a top of the support member 70. The slider 120 may include one or more of a variety of shapes, sizes, and/or configurations. For example and without limitation, the slider 120 may be rectangular and/or may extend longitudinally. The slider 120 may include a shape generally the same shape as the top of the support member 70. The slider 120 may include a protrusion 122. In embodiments, the protrusion 122 may be disposed at or about a top and/or inside of the slider 120. The protrusion 122 may include a first surface 124 and/or a second surface 126. The first surface 124 and/or the second surface 126 may be substantially planar. The first surface 124 may be disposed substantially perpendicular to the longitudinal direction and/or may face rearward. The second surface 126 may be substantially parallel to the longitudinal direction. The first surface 124 and the second surface 126 may be disposed in a L-shaped configuration.

In embodiments, such as generally shown in FIGS. 6A and 6B, a first lever 80 may include a second contact portion 130. The second contact portion 130 may be disposed at a top of the first lever 80 (e.g., the second contact portion 130 may be and/or be referred to as a top portion of the first lever 80). The contact portion 82 and the second contact portion 130 may be connected to the body 80B such that the contact portion 82 and the second contact portion 130 may rotate simultaneously. The second contact portion 130 may include a first surface 132 that may be disposed substantially perpendicular to the longitudinal direction, and/or the second contact portion 130 may include a second surface 134. The first surface 132 and/or the second surface 134 may be substantially planar and/or may be disposed in an L-shaped configuration. The first lever 80 may include a recess 136. The recess 136 may be disposed proximate the second contact portion 130, and/or the recess 136 may be disposed under the second contact portion 130. The recess 136 may be configured to avoid contact between the first lever 80 and a second lever engagement portion 128 of the slider 120. The second lever engagement portion 128 may be configured to actuate the second lever 90 upon moving the slider 120 in the longitudinal direction. As the second lever engagement portion 128 moves longitudinally (e.g., in a rearward and/or forward direction), the second lever engagement portion 128 may pass though the recess 136 in the first lever 80 and may not actuate the first lever 80. The second lever engagement portion 128 may include a tapered configuration such that the second lever engagement portions is disposed at an oblique angle relative to a longitudinal direction and/or a lateral direction.

In embodiments, a slider 120 may include a first position (see, e.g., FIG. 7A), a second position (see, e.g., FIG. 7B), and/or a third position (see, e.g., FIG. 7C). In the first position of the slider 120 (e.g., an unactuated position), the first lever 80 may be disposed in the first lever position and the contact portion 82 may be longitudinally aligned with the first edge 52 and/or the second edge 54 of the window 50, which may limit movement of the support member to the first portion 56 of the track 30. In the first position of the first lever 80, the second contact portion 130 may be configured to limit movement of the slider 120 to movement between the first position and the second position of the slider 120. For example and without limitation, in the first position of the first lever 80, the first surface 132 may be aligned (e.g., in a longitudinal direction) with the first surface 124 of the protrusion 122 of the slider 120 such that the slider 120 may slide in a first direction (e.g., rearward) to the second position of the slider 120.

With embodiments, such as generally illustrated in FIG. 7B, the second contact portion 130 may remain in the first position while the slider 120 moves to the second position. In the second position of the slider 120, the second contact portion 130 may contact the protrusion 122 of the slider 120. Contact between the second contact portion 130 and the protrusion 122 may include the first surface 132 of the second contact portion 130 contacting the first surface 124 of the protrusion 122 and limiting further movement of the slider 120 in the first direction. For example, the second contact portion 130 may prevent and/or limit the slider 120 from moving further rearward (e.g., into a third position of the slider 120) while the first lever 80 is in the first position. In the second position of the slider 120, the slider 120 may actuate the locking component 76 to facilitate movement of the support member 70 along the track 30. Preventing longitudinal movement of the slider 120 from the second position to the third position may prevent the slider from actuating or fully actuating the cam 72, the anchoring components 74, and/or the second lever 90, which may prevent the support member 70 from disconnecting from the track 30.

In embodiments, such as generally illustrated in FIG. 7C, the first lever 80 may rotate to a second position. The first lever 80 may rotate from the first position to the second position via an external actuator 116 that may be connected at or about the second contact portion 130. In the second position of the first lever 80, the second surface 134 of the second contact portion 130 may not be aligned with or in contact with an inner surface of the slider 120, which may permit the slider 120 to move from the second position to the third position. In the third position, the slider 120 may actuate one or more of the cam 72, the anchoring components 74, and/or the second lever 90, which may permit disconnecting the support member 70 from the track 30. While the first lever 80 is in the second position, the contact portion 82 of the first lever 80 may not be longitudinally aligned with the first edge 52 and/or second edge 54 of the window 50, and the first lever 80 may not restrict movement of the support member 70 (e.g., the support member 70 may move freely along the track 30).

With embodiments, when the slider 120 is in the third position, the second surface 134 of the second contact portion 130 may contact the second surface 126 of the protrusion 122, and/or the third portion 88 of the contact portion 82 may contact the inner surface of the first side wall 38 of the inner portion 32 of the track 30, either or both of which may prevent rotation of the first lever 80 (e.g., back to the first position of the first lever 80).

Figure 5B:
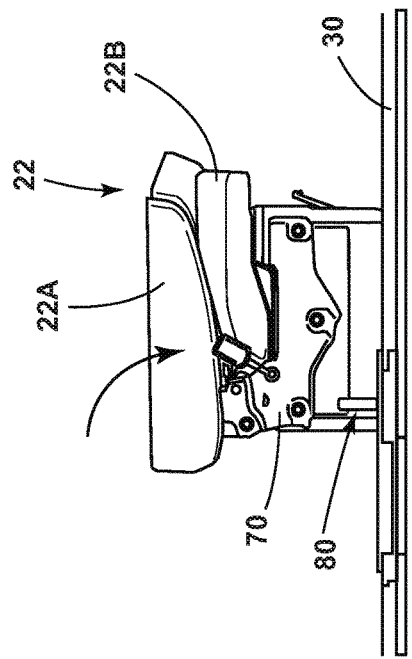
FIGS. 5B and 5C are side views generally illustrated portions of embodiments of a seat in a non-seating configuration and a track assembly with a support member in a first portion of a track according to teachings of the present disclosure.
Figure 5C:
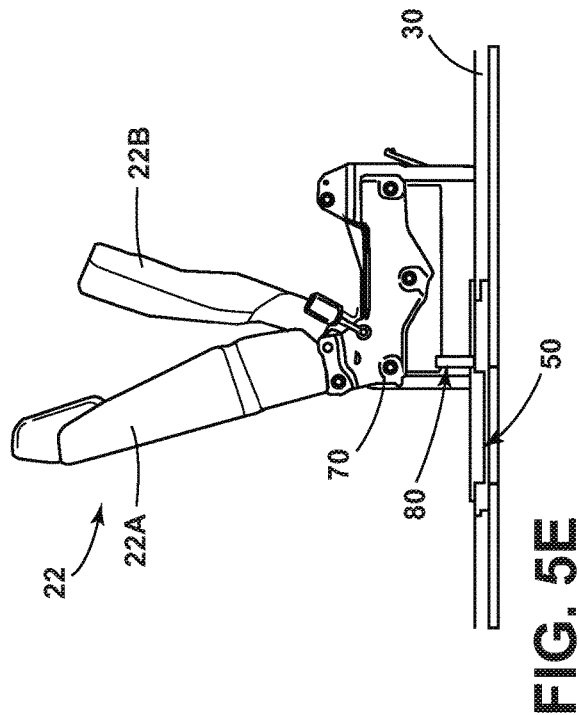

In embodiments, the external actuator 116 may be connected to the external component 22, such as to the seat back 22A and/or the seat cushion 22B. The external actuator 116 may include one or more of a variety of configurations, and may include, for example and without limitation, a Bowden cable. Actuation of the external actuator 116 may be controlled according to positions of the seat back 22A and/or the seat cushion 22B. For example and without limitation, the external actuator 116 may not be actuated while the seat back 22A and the seat cushion 22B are in a seating configuration, such as generally illustrated in FIG. 5A. The external actuator 116 may be actuated in a first direction if the seat back 22A is folded down (see, e.g., FIG. 5B) or if the seat cushion 22B is folded up (see, e.g., FIG. 5C). For example and without limitation, folding of the seat back 22A or the seat cushion 22B may cause translation of part or all of the external actuator 116. Actuation of the external actuator 116 may cause the first lever 80 to rotate from the first position to the second position, which may permit free movement of the seat 22 and/or the support member 70 along the track 30.

In embodiments, movement of the seat 22 to a non-seating configuration may be the only means of actuating the external actuator 116. In such embodiments, the first lever 80 may prevent movement of the support member 70 out of the first portion 56 of the track 30 and into the second portion 58 or the third portion 60 while the seat 22 is in a seating configuration.

Returning the seat back 22A or the seat cushion 22B to a seating configuration may cause and/or permit actuation of the external actuator 116 in a second direction. The biasing member 110 that may be connected to the first lever 80 may be configured to actuate the external actuator 116 in the second direction, such as when the seat 22 is in a seating configuration.

In embodiments, a track assembly 20 may be configured restrict movement of the support member 70 into the second portion 58 or the third portion 60 of the track 30 while the seat 22 is in a seating configuration. Additionally or alternatively, a track assembly 20 may limit the configuration of the seat 22 to a non-seating configuration if the support member 70 is not in the first portion 56 of the track 30, which may facilitate preventing misuse of the seat belt assembly 114, such as use of the seat belt assembly 114 when the seat 22 is too far away from the mounting portion 112.

Figure 5D:
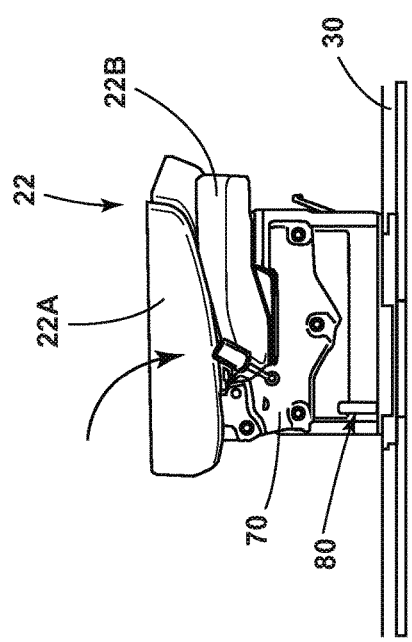
FIGS. 5D and 5E are side views generally illustrated portions of embodiments of a seat in non-seating configuration and a track assembly with a support member outside of a first portion of a track according to teachings of the present disclosure.
Figure 5E:
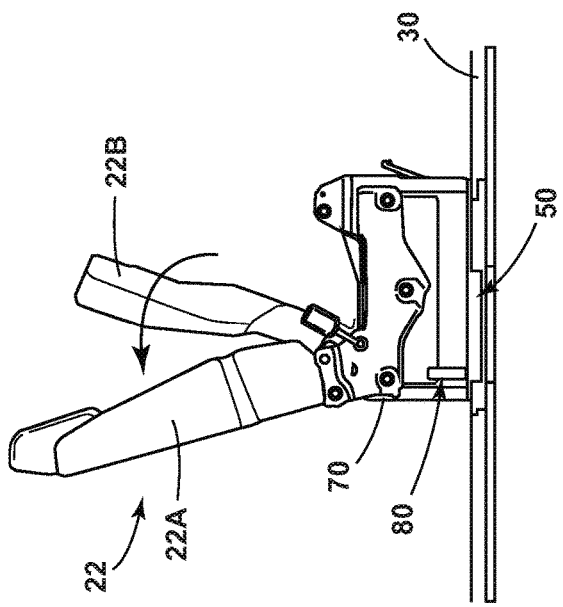

With embodiments, such as generally illustrated in FIGS. 5D and 5E, the first lever 80 may be configured restrict actuation of the external actuator 116 in the second direction, and/or the first lever 80 may be configured to restrict movement of the seat back 22A and/or the seat cushion 22B, in at least some circumstances. For example and without limitation, if the external actuator 116 has been actuated in the first direction, the first lever 80 has moved to the second position, and the support member 70 has moved into the second portion 58 or the third portion 60 of the track 30, then (i) the third portion 88 of the contact portion 82 may contact the inner surface of the first side wall 38 of the inner portion 32 of the track 30, and/or (ii) the second surface 134 of the first lever 80 may contact the second surface 126 of the slider 120, either or both of which may prevent rotation of the first lever 80 toward the first position of the first lever 80. If the first lever 80 is prevented from rotating, the external actuator 116 may be restricted or prevented from being actuated in the second direction, which may substantially prevent movement of the seat back 22A and/or the seat cushion 22B (e.g., restrict the seat 22 to non-seating configurations).

With embodiments, the first lever 80 may return to the first position via the biasing member 110 when the slider 120 returns to the first position and/or the second position, and the first lever 80 is not actuated via the external actuator 116 (e.g., the seat 22 is returned to a seating configuration).

In embodiments, the first lever 80 may be configured to provide one or more functions. For example and without limitation, the first lever 80 may be configured to (i) limit movement of the support member 70 to within the first portion 56 of the track 30 while the seat 22 is in a seating configuration, (ii) prevent removal of the support member 70 from the track 30 while the seat 22 is in the seating configuration, and/or (iii) prevent moving of the seat 22 from a non-seating configuration to a seating configuration while the support member 70 is outside of the first portion 56 of the track 30.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A track assembly, comprising;
   a track;
   a lever including a rotational axis substantially parallel to the track;
   a support member connected to the lever; and
   wherein the lever rotates about the rotational axis between a first position and a second position;
   the lever is configured to engage the track in a longitudinal direction when the lever is in the first position;
   and the lever is configured to contact an inner surface of the track in a lateral direction when the lever is in the second position.

2. The track assembly of claim 1, wherein the lever is configured to limit longitudinal movement of the support member along the track.

3. The track assembly of claim 1, wherein the track includes a longitudinal window having a first edge and a second edge.

4. The track assembly of claim 3, wherein a location of the longitudinal window corresponds to a seat position relative to a seat belt assembly; and
   the first edge and the second edge correspond to maximum separation distances between the seat belt assembly and the support member.

5. The track assembly of claim 3, wherein the lever is connected to a biasing element configured to move the lever from the second position to the first position when a contact portion of the lever is laterally aligned with the longitudinal window.

6. The track assembly of claim 1, wherein the support member is connected to a seat including a seat back and a seat cushion; the lever is connected to at least one of the seat back or the seat cushion; and the lever is configured to limit movement of the seat into a seating position when the lever is in the second.

7. The track assembly of claim 1, wherein a seat connected to the support member is in a non-seating configuration when the lever is in the second position; and
   the seat is in a seating configuration when the lever is in the first position.

8. The track assembly of claim 3, wherein the longitudinal window corresponds to a portion of a side wall of the track with a reduced height.

9. The track assembly of claim 1, including a seat belt assembly with a mounting portion, wherein the mounting portion does not move with the support member.

10. The track assembly of claim 1, wherein the lever is connected to a biasing element configured to bias the lever toward the first position.

11. The track assembly of claim 1, wherein the lever includes a contact portion having a first portion, a second portion, and a third portion.

12. The track assembly of claim 11, wherein the contact portion is substantially triangular.

13. The track assembly of claim 11, wherein longitudinal movement of the support member is limited when the third portion of the contact portion is not in contact with the track.

14. The track assembly of claim 11, wherein longitudinal movement of the support member is not substantially limited when the third portion of the contact portion is in contact with the track.

15. The track assembly of claim 11, wherein the track includes a window having a first edge and a second edge, and wherein at least one of the first portion and the second portion is configured to contact at least one of the first edge and the second edge of the window;
   the track includes a first track portion and a second track portion;
   the window extends along substantially all of the first track portion;
   and the lever is configured to prevent movement of a seat connected to the support member from a non-seating configuration to a seating configuration while the support member is outside of the first track portion.

16. The track assembly of claim 15, wherein the third portion does not contact the track in the first position; and the third portion contacts the inner surface of the track in the second position.

17. The track assembly of claim 16, wherein the first portion and the second portion are substantially parallel.

18. The track assembly of claim 16, wherein the first portion and the second portion are substantially perpendicular to the longitudinal direction of the track.

19. A vehicle, including,
   the track assembly of claim 1;
   a vehicle body; and
   a seat belt assembly;
   wherein the track includes a longitudinal window having a first edge and a second edge;
   and the longitudinal window corresponds to a position of a mounting portion of the seat belt assembly to define a safe seating zone.

20. The vehicle of claim 19, wherein the mounting portion of the seat belt assembly is fixedly attached to the vehicle body.

* * * * *